B. M. W. HANSON.
METAL WORKING MACHINE.
APPLICATION FILED AUG. 19, 1919.
1,432,853.
Patented Oct. 24, 1922.
2 SHEETS—SHEET 2.
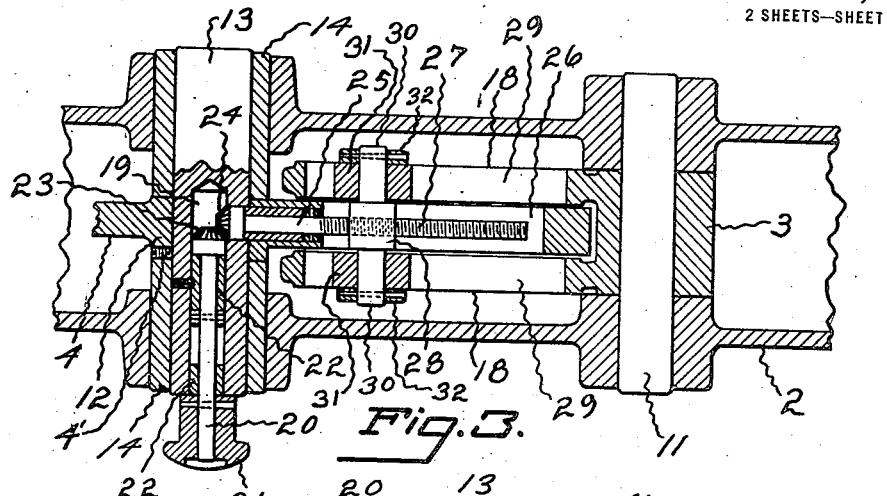
Fig.3.
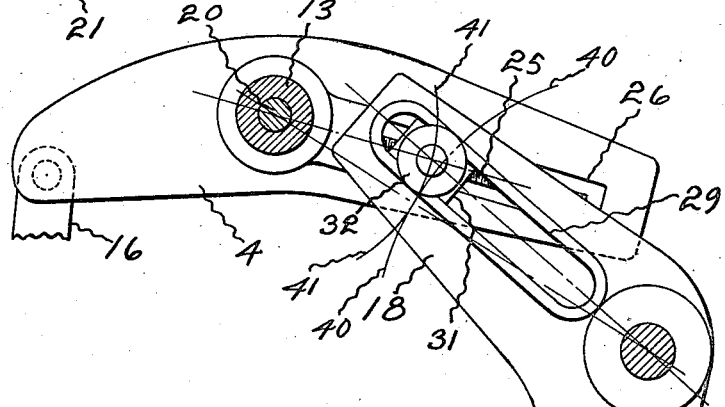
Fig.4.
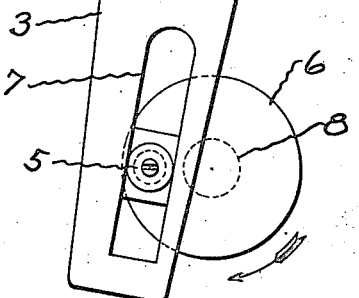
Inventor
B. M. W. Hanson,
By
Attorney Patented Oct. 24, 1922.

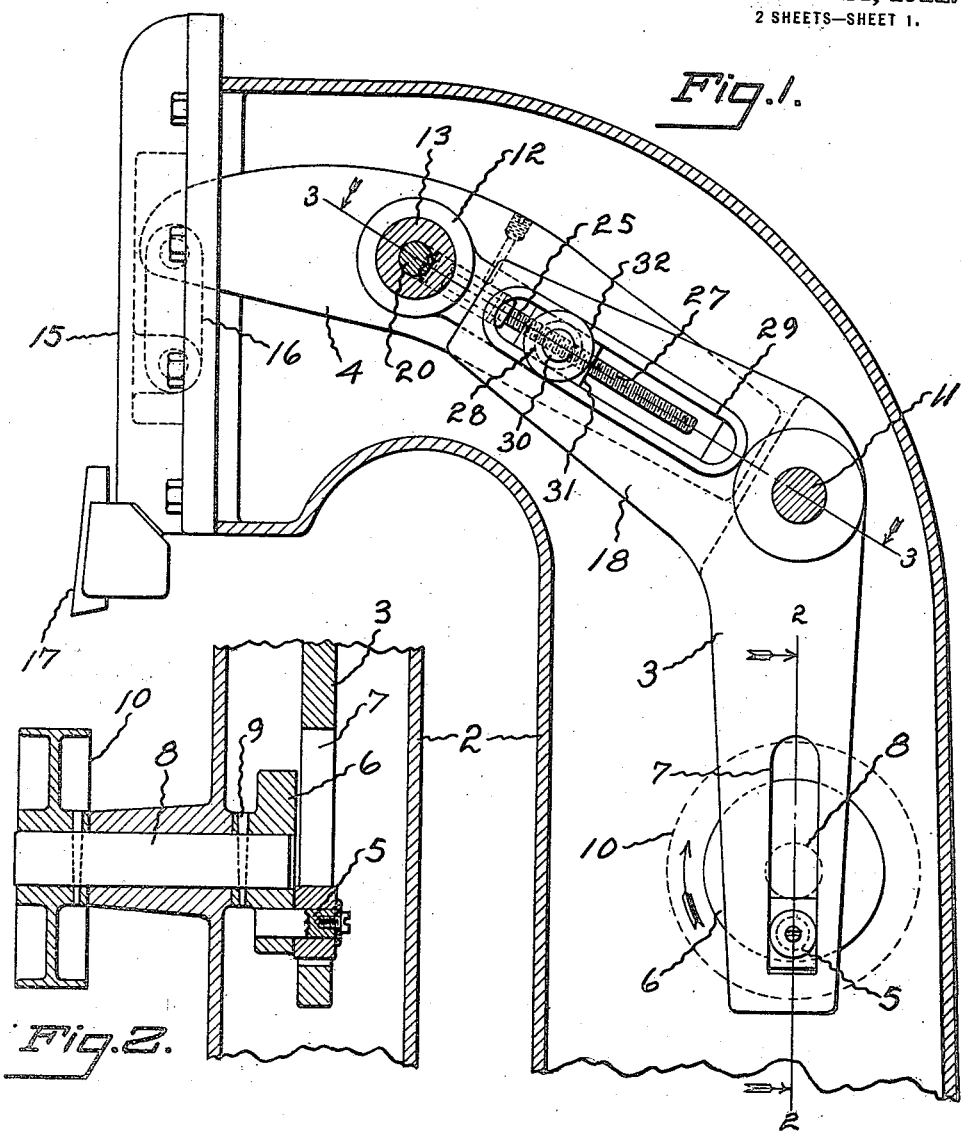

1,432,853

UNITED STATES PATENT OFFICE.

BENGT M. W. HANSON, OF HARTFORD, CONNECTICUT.

METAL-WORKING MACHINE.

Application filed August 19, 1919. Serial No. 318,533.

*To all whom it may concern:*

Be it known that I, BENGT M. W. HANSON, a citizen of the United States, residing at Hartford, in the county of Hartford and State of Connecticut, have invented certain new and useful Improvements in Metal-Working Machines, of which the following is a specification.

This invention relates to shapers. I have several primary motives in view among the most important being the provision of effective means by which I can translate an irregular movement into a regular one. This irregular movement may be presented by any desirable source of power such as a crank or wrist pin and the regular movement may be received by a tool. In the case of a shaper this would be a tool utilized as its name applies for shaping. In connection with such a machine I might observe, that I have obtained particularly important results.

In the drawings accompanying and forming part of the present specification I have shown somewhat in detail one of the several forms of embodiment of the invention which to enable those skilled in the art to practice the same will be set forth fully in the following description. I am not restricted to this disclosure. I may depart therefrom in several respects within the scope of the invention defined by the claim following said description.

Referring to said drawings:

Figure 1 is a vertical side elevation of a metal-working machine involving the invention.

Fig. 2 is a vertical section on the line 2—2 of Fig. 1.

Fig. 3 is a longitudinal section on the line 3—3 of Fig. 1.

Fig. 4 is an elevation of associated rockers and certain co-operating parts hereinafter more particularly described.

As I have already noted the invention constituting the subject matter of the present case is susceptible of general use although I have indicated several fields where it is of especial advantage. In the drawings I have shown a part of a "shaper" as it is known. For instance in Fig. 1 I have shown the hollow head or column 2 of a shaper. This frame member or head 2 constitutes a convenient casing for supporting and enclosing certain of the elements of the structure.

There is naturally power to be applied and although this may be of any convenient character I will describe the form shown which is satisfactory. There is also a part to be operated which is assumed in the present case to be a tool as I will later explain. The means shown for transferring the effect from the power-operable member itself to the part which is to be operated, involves as shown two rockers or levers as 3 and 4 which may be properly considered as the primary and the secondary rockers or levers. The primary lever 3 in the present case is directly operated as by the crank pin or eccentric stud 5 on the rotary disk 6, the outer end of the stud being seated in a longitudinal slot 7 in the tail or lower branch of the lever or rocker 3 as shown clearly in Figs. 1, 2 and 4. As shown the disk 6 is rigid with the shaft 8; for instance it may be fastened thereto as by the pin 9. The shaft 8 is supported by the frame member or head 2, extends thereinto and is furnished as illustrated at its outer end with a pulley 10 constituting a suitable driver for rotating the shaft 8 and the disk 6 and the consequent revolution of the pin or stud 5, and the oscillation of the rocker or lever 3. This lever or rocker 3 is shown as somewhat bent or of elbow form, having practically at the junction of its two branches, an opening to receive the pivot 11 sustained by suitable bearings upon the opposite sides of the frame member or head 2.

The rocker or lever 4 is supported for oscillation between its ends, as is the companion or primary rocker or lever 3. The central hub 12 of this secondary rocker or lever 4 rocks on the pivot or stud 13 the end portions of which are set in co-axial bushings 14 supported in bearings projecting through the side walls of the frame member or head 2, the inner ends of the bushings 14 as shown being practically in contact with the opposite side faces of the hub 12. The frame member or head 2 as shown supports on its front side a tool-carrier 15 connected as by a link 16 with the forward branch of the secondary lever 4. As illustrated the tool-carrier 15 sustains a tool 17 which is assumed to be a shaping tool. It may be clear although it will be made more so hereinafter, that the rocker or lever 3 transmits its effect to the rocker or lever 4 and the latter through the link 16 reciprocates the carrier 15 to effect the desired action of the tool which action should be a regular one. This action of the tool however, is at the same time an adjustable one and the adjustment can be instantly brought about while the machine is in action which in a shaper as I understand, is not possible at the present time.

The adjoining branches of the two rockers 3 and 4 are desirably interfitted, and this I can obtain by disposing the rear branch of the lever or rocker 4 between the sides or cheeks 18 of the front or forward branch of the primary rocker 3. I also provide for adjustably connecting the two rockers so that the stroke of the forward or front one can be regulated or adjusted and this adjustment I obtain in a very desirable way. The pivot or pin 13, which is shown as a convenient support for the forward rocker or lever, is longitudinally bored as at 19 from one end to a point a little beyond its center as best shown in Fig. 3. This bore 19 constitutes a convenient means for receiving the shaft 20 the forward or outer end of which as shown is provided for ease of manipulation, with a knob or finger piece 21 pinned or otherwise fastened thereto. The shaft 20 rocks as will be understood and it turns in bearing sleeves as 22 fitted in the axial bore 19. As shown the shaft 20 has fixed to its inner end the bevel gear 23 in mesh with a bevel gear 24 fixed on the screw 25 extending rearwardly through the hub portion of the rocker 4. The screw 25 therefore swings with the rocker 4 and extends into a longitudinal slot as 26 (Fig. 3) in the rear branch of the secondary rocker 4 being threaded at 27 in said slot 26 to receive the nut 28 which has a sliding movement in the slot 26 the nut however being incapable of rotation within said slot. The pivot or pin 13 as shown, is made rigid with the rocker 4, as by the screw 4' tapped through the hub of the rocker and engaging the pivot or pin. It will therefore be clear that upon the turning of the screw or shaft 25, the nut 28 will be adjusted longitudinally of the slot and this particular adjustment it will be evident can be secured through the turning of the knob or thumb piece 21 and intermediate described parts. This adjustment I might note can be secured while the machine is in motion which is an important consideration. In shaping machines and those of a like character it has heretofore always been necessary to stop the machine when the adjustment of a tool such as 17 or some similar result is to be obtained.

The sides or cheeks 18 of the forward or inner branch of the primary or main rocker 3, have as shown longitudinal slots 29 in exact transverse register with each other, it being understood of course that the rear branch or arm of the secondary rocker is supported between these branches or cheeks 18. The nut 28 it will be evident has a sliding non-rotative movement in the slot 26 under the action of the screw 27 through the primary action as shown of the knob or finger piece 21. This blocklike nut 28 as illustrated has two laterally coincident projections as 30 which extend freely practically centrally through the slides or blocks 31 fitted for free sliding or reciprocative movement in the respective slots 29. It is evident that opposite faces of the blocks 31 are in flatwise contact with opposite side walls of the two slots 29 in which as will hereinafter appear they have a sliding motion. The blocks 31 may be held against accidental displacement in any desirable manner as by the washers 32 fastened suitably to the outer projecting ends of the two studs or pivots 30 as shown best in Fig. 3. It might be noted at this time that during the oscillation of the primary rocker 3 the blocks 31 reciprocate or travel back and forth in their co-operating slots 29. The rocker or lever 3 as I have already stated is power-operated in the present case, and through the blocks 31 and the nut 28 owing to the adjustment of the latter the movement or stroke of the rocker or secondary lever 4 may be regulated to correspondingly govern through the described parts the amount of movement of the tool 17. Although the double rocker or lever construction I am now describing is highly satisfactory, it may not always be necessary to use the same. That is to say, while one of my important advantages is the production of a machine, of a uniform power derived from a part which has a variable movement, this may not always be necessary. In like cases many other deviations may be adopted.

It will be assumed that the shaft 8, is being rotated by the pulley 10 or otherwise. This as a consequence causes the rotation of the disk 6 and the resultant revolution of the wrist or crank pin 5 the block of which in its reciprocation in the slot 7 of the rear arm of the lever 3 causes said lever to rock or oscillate. The forward branch of this lever being connected with the rear branch of the lever 4 causes in turn the oscillation of the lever 4 and the consequent movement of the tool through the agency of the described connections. During the oscillation of the lever 3 the blocks 31 slide freely back and forth in their respective slots 29 and as a consequence of this it will be evident that the irregularity in movement of the crank pin is converted into a more regular movement at the place desired. The amount of this movement can be instantly changed as I have virtually already explained through the turning of the knob or finger piece 21 while the machine is in action. It will be obvious that the machine comprises broadly a primary rocker and a secondary rocker one of these rockers having movable therewith an adjustable element which has a sliding connection with the other and although this adjustment is accomplished by means in connection with the secondary lever and although the slidable member is sustained by the primary rocker to which power is usually applied, this may not always be necessary. It is however as I have already observed a highly advantageous point resulting in the conversion of an irregular into a more regular motion.

It will be evident that the increased leverage of the primary rocker 3 occurs at the point where the crank motion decreases in speed and as a consequence I can obtain a more uniform motion of a cutting or like tool 17 than would otherwise be possible. I have shown in Fig. 4 by the arcuate lines 40 and 41 this effect. The line 40 is struck from the center of motion of the primary rocker 3 while the line 41 is struck from the center of motion of the secondary rocker 4.

What I claim is:

A machine of the class described comprising a primary rocker, a secondary rocker, the two rockers having branches which overlie each other, the overlying branch of the primary rocker having longitudinally slotted sides to receive the corresponding branches of the companion rocker, slides supported for free movement in said slots, a turnable shaft extending through the center of motion of the secondary rocker, a shaft supported by the overlying branch of the secondary rocker and having a geared connection with said other shaft, a nut having a threaded feed connection with said second shaft and provided with lateral extending pins projecting through the respective slides.

In testimony whereof I affix my signature in the presence of two witnesses.

BENGT M. W. HANSON.

Witnesses:
HERBERT S. BULLARD,
HEATH SUTHERLAND.